(12) United States Patent
Ke et al.

(10) Patent No.: US 12,155,089 B1
(45) Date of Patent: Nov. 26, 2024

(54) BATTERY CELL, BATTERY, AND ELECTRICAL DEVICE

(71) Applicant: CONTEMPORARY AMPEREX TECHNOLOGY CO., LIMITED, Ningde (CN)

(72) Inventors: Haibo Ke, Ningde (CN); Quankun Li, Ningde (CN); Jiawei Liu, Ningde (CN); Junqi Cao, Ningde (CN); Peng Wang, Ningde (CN); Guoan Mao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/792,505

(22) Filed: Aug. 1, 2024

Related U.S. Application Data (63) Continuation of application No. PCT/CN2022/113927, filed on Aug. 22, 2022.

(51) Int. Cl.
*H01M 50/477* (2021.01)
*H01M 50/209* (2021.01)
(Continued)

(52) U.S. Cl.
CPC ....... *H01M 50/477* (2021.01); *H01M 50/209* (2021.01); *H01M 50/474* (2021.01); *B60R 16/033* (2013.01); *H01M 2220/20* (2013.01)

(58) Field of Classification Search
CPC .......................... H01M 10/653; H01M 40/658
See application file for complete search history.

(56) References Cited

U.S. PATENT DOCUMENTS

| 3,891,462 A * | 6/1975 | Langkau | H01M 10/0427 429/173 |
| 2023/0223623 A1* | 7/2023 | Kawai | H01M 50/164 429/163 |

FOREIGN PATENT DOCUMENTS

| CN | 208062214 U | 11/2018 |
| CN | 216750210 U | 6/2022 |

(Continued)

OTHER PUBLICATIONS

International Search Report received in the corresponding International Application PCT/CN2022/113927, mailed on Mar. 22, 2023.
(Continued)

*Primary Examiner* — Maria Laios
*Assistant Examiner* — Jordan E Berresford
(74) *Attorney, Agent, or Firm* — Kilpatrick Townsend & Stockton LLP (57) ABSTRACT

An embodiment of the present application provides a battery cell, a battery and an electrical device. The battery cell includes: a case, which is a hollow structure having a first opening end; an end cover assembly for covering the first opening end; an electrode assembly accommodated in the case; and an insulating guard layer disposed between the electrode assembly and the case to wrap at least part of the electrode assembly, wherein the insulating guard layer includes a main body portion and a protrusion structure, the main body portion has a second opening end facing the first opening end, the protrusion structure is connected to the second opening end and extends toward the end cover assembly, and the protrusion structure is used for connecting with the end cover assembly.

13 Claims, 4 Drawing Sheets

(51) Int. Cl.
*H01M 50/474* (2021.01)
*B60R 16/033* (2006.01)

(56) References Cited

FOREIGN PATENT DOCUMENTS

| | | |
|---|---|---|
| CN | 217158372 U | 8/2022 |
| CN | 217485527 U | 9/2022 |
| JP | 2016021340 A | 2/2016 |
| JP | 2019050095 A | 3/2019 |

OTHER PUBLICATIONS

Written Opinion of ISA received in the corresponding International Application PCT/CN2022/113927, mailed on Mar. 22, 2023.

\* cited by examiner

BATTERY CELL, BATTERY, AND ELECTRICAL DEVICE

CROSS-REFERENCE TO RELATED APPLICATIONS

This application is a continuation of International Application No. PCT/CN2022/113927, filed on Aug. 22, 2022, the content of which is incorporated herein by reference in its entirety.

TECHNICAL FIELD

The present application relates to the technical field of batteries, and in particular, to a battery cell, a battery and an electrical device.

BACKGROUND

With the continuous advancement of the battery technology, various new energy industries using batteries as energy storage devices have developed rapidly. In the development of the battery technology, in addition to improvement of the performance of batteries, it is also a non-negligible issue to improve safety and processing efficiency. Therefore, it is a technical problem urgently to be solved in the development of battery technology how to enhance the processing efficiency and safety of the batteries.

SUMMARY OF THE INVENTION

An embodiment of the present application provide a battery cell, a battery and an electrical device, which can improve the safety performance of the battery cell.

In a first aspect, a battery cell is provided, including: a case, which is a hollow structure having a first opening end; an end cover assembly for covering the first opening end; an electrode assembly accommodated in the case; and an insulating guard layer disposed between the electrode assembly and the case to wrap at least part of the electrode assembly, wherein the insulating guard layer includes a main body portion and a protrusion structure, the main body portion has a second opening end facing the first opening end, the protrusion structure is connected to the second opening end and extends toward the end cover assembly, and the protrusion structure is used for connecting with the end cover assembly.

Therefore, in the battery cell in the embodiment of the present application, the insulating guard layer has a main body portion and a protrusion structure, the main body portion has a second opening end, the protrusion structure is connected with the second opening end and extends toward the end cover assembly, and the connection between the protrusion structure and the end cover assembly enables the connection between the insulating guard layer and the end cover assembly. When a traditional insulating guard layer is connected with the end cover assembly, the main body portion of the insulating guard layer is not provided with the protrusion structure. That is, an edge of the main body portion for forming the second opening end is basically flush, and the main body portion is connected to the end cover assembly by the flush edge. Then the insulating guard layer may be lifted, misaligned or wrinkled during the connection. Since the end cover assembly needs to cover the first opening end of the case, for example, the end cover assembly can be connected to the case by welding, then when the insulating guard layer is connected to the end cover assembly, if the insulating guard layer is misaligned or lifted, it is likely to affect a welding region between the end cover assembly and the case, causing a welding explosion point to affect the connection between the end cover assembly and the case, thereby reducing the processing efficiency of the battery cell, and also affecting the security of the battery cell. The insulating guard layer in the embodiment of the present application is provided with a protrusion structure at which the connection between the insulating guard layer and the end cover assembly is realized. On one hand, the risk of the insulating guard layer being lifted or misaligned can be reduced; and on the other hand, a region of the insulating guard layer in which no protrusion structure is disposed can be avoided from the welding region between the end cover assembly and the case, so as to reduce the impact of the connection between the insulating guard layer and the end cover assembly on the connection between the end cover assembly and the case, thereby improving the processing efficiency and safety performance of the battery cell.

In some embodiments, the end cover assembly includes: an end cover body for covering the first opening end; an insulating member located between the end cover body and the electrode assembly, and the protrusion structure is connected to the insulating member. The end cover body and the insulating member included in the end cover assembly can be used for realizing different functions of the end cover assembly respectively, which also facilitates processing.

In some embodiments, a surface of the insulating member facing the electrode assembly is provided with a supporting portion protruding toward the electrode assembly, and the protrusion structure is connected to a side wall of the supporting portion. The supporting portion can be used for pressing against the electrode assembly and reduce the possibility of the electrode assembly moving in the case. Additionally, the end cover body is used for covering the case, so that the protrusion structure is connected with the supporting portion protruding from the surface of the insulating member, for example by welding, which can reduce the impact on the connection between the end cover body and the case, and also facilitates welding between the protrusion structure and the supporting portion.

In some embodiments, at least one of two side edges of the protrusion structure that are oppositely disposed along an own width direction of the protrusion structure includes an oblique line segment and/or a curved segment, and a width direction of the protrusion structure is perpendicular to an extension direction and a thickness direction of the protrusion structure.

In this way, a width of the protrusion structure is different in different regions along the extension direction of the protrusion structure. Then, even if in an region where the width of the protrusion structure is small, due to dimension restrictions, when welding and the like means are used for connecting, a welding stamp may exceed the range of the protrusion structure. However, since the protrusion structure has other regions with larger widths, the welding stamp in this region will not exceed the range of the protrusion structure, which can not only improve the welding strength, i.e., improve the stability between the insulating guard layer and the end cover assembly, but also prevent an edge of the welding stamp from covering the edge of the protrusion structure, thereby reducing the risk of incorrect or failed grasping of a boundary of the protrusion structure in a process of monitoring a welding effect.

In some embodiments, a width of at least part of the protrusion structure gradually decreases along the extension direction of the protrusion structure.

For the insulating guard layer, the width in a region near the end cover assembly is smaller, then an avoidance space of the insulating guard layer between two adjacent protrusion structures is larger. This avoidance space can be used for avoiding from the connection between the end cover assembly and the case, thereby avoiding a local region of the insulating guard layer from being misaligned or lifted to affect the connection between the end cover assembly and the case. On contrary, the width in a region of the protrusion structure away from the end cover assembly is larger, then even if in a region of the protrusion structure near the end cover assembly, due to dimension restrictions, when connection is conducted by welding means, the welding stamp may exceed the range of the protrusion structure. However, a width in the region of the protrusion structure away from the end cover assembly is larger, and the welding stamp in the region usually does not exceed the range of the protrusion structure, which can increase the welding strength, i.e., improving the stability between the insulating guard layer and the end cover assembly.

The protrusion structure is set to be trapezoidal, and for the insulating guard layer, the avoidance space of the insulating guard layer between two adjacent protrusion structures is larger when it is closer to the end cover assembly. The avoidance space can be used for avoiding from the connection between the end cover assembly and the case, thereby avoiding a local region of the insulating guard layer from being misaligned or lifted to affect the connection between the end cover assembly and the case. Moreover, the width of the protrusion structure of the insulating guard layer is larger when the protrusion structure is farther away from the end cover assembly, so that even in an region of the protrusion structure close to the upper base, due to dimension restrictions of the upper base, when connection is conducted by welding means, the welding stamp may exceed the range of the protrusion structure. However, a length of the lower base of the protrusion structure is larger than that of the upper base, and the welding stamp in a region close to the lower base usually does not exceed the range of the lower base, which can improve the welding strength, i.e., improving the stability between the insulating guard layer and the end cover assembly.

In some embodiments, the protrusion structure is trapezoidal, and a length D1 of the upper base of the protrusion structure satisfies: $\Delta D = D1 - D3$, with a value range of $\Delta D$ of [2 mm, 10 mm]; where D3 is a width of a connection region between the protrusion structure and the end cover assembly, and a width direction of the connection region is parallel to the upper base of the protrusion structure.

The length of the upper base of the protrusion structure is the minimum width of the protrusion structure. If the width D3 of the connection region is set to be smaller than the length D1 of the upper base of the protrusion structure, then the connection region will not exceed the protrusion structure, which can improve the strength of the connection between the insulating guard layer and the end cover assembly. Additionally, the difference $\Delta D$ between the length D1 of the upper base of the protrusion structure and the width D3 of the connection region should not be set too large, otherwise the width of the protrusion structure will be too large, and accordingly the avoidance space between adjacent protrusion structures is smaller, which may affect the connection between the end cover assembly and the case. On the contrary, the difference $\Delta D$ between the length D1 of the upper base of the protrusion structure and the width D3 of the connection region should also not be set too small, so as to avoid increasing the difficulty in processing the connection between the insulating guard layer and the end cover assembly.

In some embodiments, a value range of a length of a waist of the protrusion structure is [2 mm, 6 mm]. If the length of the waist of the protrusion structure is too small, the height of the protrusion structure will also be too small, so that the insulating guard layer cannot effectively avoid from the connection portion between the end cover assembly and the case. Misalignment or lifting of the insulating guard layer will affect the welding between the end cover assembly and the case, which reduces the safety of the battery cell. On the contrary, if the length of the waist of the protrusion structure is too large, and if an angle between the waist of the protrusion structure and the lower base is constant, then the height of the protrusion structure will be too large, so that in order to effectively isolate the electrode assembly from the case, the height of the electrode assembly will be reduced, which will reduce the utility rate of space inside the battery cell and also reduce the energy density of the battery cell.

In some embodiments, a value range of the angle between the waist and the lower base of the protrusion structure is [30°, 60°]. If the angle between the waist and the lower base of the protrusion structure is too small, the height of the protrusion structure will be too small, so that the insulating guard layer cannot effectively avoid from the connection portion between the end cover assembly and the case. Misalignment or lifting of the insulating guard layer will affect the welding between the end cover assembly and the case, which reduces the safety of the battery cell. On the contrary, if the angle between the waist and the lower base of the protrusion structure is too large, the shape of the protrusion structure will be close to a rectangle. At this time, if the width of the protrusion structure is too small, the connection region between the insulating guard layer and the end cover assembly will be too small, which increases the difficulty of connection; and if the width of the protrusion structure is too large, the avoidance space between adjacent protrusion structures will be too small, making it impossible to effectively avoid from the connection portion between the end cover assembly and the case, which will also reduce the safety of the battery cell.

In some embodiments, the second opening end is polygonal, and a corner of the second opening end is provided with the protrusion structure. On one hand, disposing the protrusion structure at an intersection of two adjacent side walls of the main body portion can increase the stability of and facilitate the implementation of the connection between the insulating guard layer and the end cover assembly; and on the other hand, since a plurality of components included in the end cover assembly are usually not disposed near the corner of the second opening end, the insulating guard structure is provided with the protrusion structure at the corner of the second opening end to avoid affecting other components of the end cover assembly.

In some embodiments, the protrusion structure is disposed between two adjacent corners of the second opening end. In addition to being disposed at the corners, one or more protrusion structures can also be disposed between two adjacent corners of the second opening end to increase the size of the connection region between the insulating guard layer and the end cover assembly and further improve the stability of the insulating guard structure.

In some embodiments, a tab is disposed on a tab end face of the electrode assembly, the tab end face faces the end cover assembly, and the insulating guard layer wraps other surfaces of the electrode assembly except the tab end face.

In this way, not only the electrode assembly can be effectively isolated from the case via the insulating guard structure, but also the electrical connection between the tab of the tab end face and an electrode terminal.

In a second aspect, a battery is provided, which includes a plurality of the battery cells according to the first aspect.

In a third aspect, an electrical device is provided, which includes a plurality of the battery cells according to the first aspect, wherein the battery cell is used for providing electrical energy to the electrical device.

In some embodiments, the electrical device is a vehicle, a ship or a spacecraft.

DESCRIPTION OF DRAWINGS

In the drawings, the drawings are not drawn according to actual scale.

DETAILED DESCRIPTION

Embodiments of the present application will be described in further detail hereinafter in conjunction with the drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only used for descriptive purposes, and cannot be construed as indicating or implying relative importance. "Vertical" does not mean being vertical in the strict sense, but within the permissible range of error. "Parallel" does not mean being parallel in the strict sense, but within the permissible range of error.

Orientation words appearing in the following description are all directions shown in the drawings, and do not limit the specific structure of the present application. In the description of the present application, it should also be noted that, unless otherwise expressly specified and defined, the terms "install", "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

In the embodiments of the present application, the same reference numerals indicate the same parts and, for the sake of brevity, the detailed description of the same parts is omitted in the different embodiments. It should be understood that the dimensions such as the thickness, length, and width of various components in the embodiments of the present application shown in the drawings, as well as the dimensions such as the overall thickness, length, and width of the integrated apparatus are illustrative only and shall not constitute any limitation on the present application.

In the present application, the battery cell may include a lithium-ion secondary battery, a lithium-ion primary battery, a lithium-sulfur battery, a sodium-lithium-ion battery, a sodium-ion battery, a magnesium-ion battery, or the like, which is not limited in embodiments of the present application. The battery cell may be cylindrical, flat, rectangular, or in other shapes, which is also not limited in embodiments of the present application. The battery cells are generally divided into three types according to encapsulating manners: cylindrical battery cells, prismatic rectangular battery cells, and pouch cells, which are not limited in embodiments of the present application.

The battery mentioned in the embodiments of the present application refers to a single physical module including one or more battery cells to provide a higher voltage and capacity. For example, the battery mentioned in the present application may include a battery module, a battery pack, or the like. The battery generally includes a box for encapsulating one or more battery cells. The box can prevent liquids or other foreign matters from affecting the charging or discharging of the battery cells.

The battery cell includes an electrode assembly and an electrolyte solution, the electrode assembly being composed of a positive electrode plate, a negative electrode plate, and a separator. The battery cell works mainly relying on the movement of metal ions between the positive electrode plate and the negative electrode plate. The positive electrode plate includes a positive electrode current collector and a positive electrode active material layer, wherein the positive electrode active material layer is coated on a surface of the positive electrode current collector. Current collectors not coated with the positive electrode active material layer protrude from current collectors already coated with the positive electrode active material layer, and the current collectors not coated with the positive electrode active material layer serve as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode plate includes a negative electrode current collector and a negative electrode active material layer, wherein the negative electrode active material layer is coated on a surface of the negative electrode current collector. Current collectors not coated with the negative electrode active material layer protrude from current collectors coated with the negative electrode active material layer, and the current collectors not coated with the negative electrode active material layer serve as a negative tab. The material of the negative electrode current collector may be copper, and the negative electrode active material may be carbon, silicon, or the like. In order to ensure that no fusing occurs when a large current passes, there are a plurality of positive tabs which are laminated together, and there are a plurality of negative tabs which are laminated together. The material of the separator may be polypropylene (PP) or polyethylene (PE), etc. Moreover, the electrode assembly may be a wrapping structure or a laminated structure, and embodiments of the present application are not limited thereto.

Many aspects of design factors, e.g., energy density, cycle life, discharge capacity, charge-discharge rate and the like performance parameters, should be considered at the same time in the development of the battery technology. Additionally, the safety of the battery should also be taken into account. For example, a processing process of battery cells in a battery involves the cooperation and assembly of a plurality of components. Therefore, it is especially important for battery cells how to improve the processing efficiency while ensuring the safety performance of the battery cells.

Therefore, embodiments of the present application provide a battery cell, a battery and an electrical device. The battery cell includes a case, an end cover assembly, an electrode assembly and an insulating guard layer. The end cover assembly is used for covering a first opening end of the case, the electrode assembly is accommodated in the case, and the insulating guard layer is disposed between the case and the electrode assembly for wrapping at least part of the electrode assembly. Also, the insulating guard layer includes a main body portion and a protrusion structure, where the main body portion has a second opening end facing the first opening end, the protrusion structure is connected with the second opening end and extends toward the end cover assembly, and the connection between the protrusion structure and the end cover assembly enables the connection between the insulating guard layer and the end cover assembly. When a traditional insulating guard layer is connected with the end cover assembly, the main body portion of the insulating guard layer is not provided with the protrusion structure. That is, an edge of the main body portion for forming an edge of the second opening end is basically flush, and the main body portion is connected to the end cover assembly by the flush edge. Then the insulating guard layer may be lifted, misaligned or wrinkled during the connection. Since the end cover assembly needs to cover the first opening end of the case, for example, the end cover assembly can be connected to the case by welding, then when the insulating guard layer is connected to the end cover assembly, if the insulating guard layer is misaligned or lifted, it is likely to affect a welding region between the end cover assembly and the case, causing a welding explosion point to affect the connection between the end cover assembly and the case, thereby reducing the processing efficiency of the battery cell, and also affecting the security of the battery cell. The insulating guard layer in the embodiment of the present application is provided with a protrusion structure at which the connection between the insulating guard layer and the end cover assembly is realized. On one hand, the risk of lifting or misaligning can be reduced; and on the other hand, a region in which no protrusion structure is disposed can be avoided from the welding region between the end cover assembly and the case, so as to reduce the impact of the connection between the insulating guard layer and the end cover assembly on the connection between the end cover assembly and the case, thereby improving the processing efficiency and safety performance of the battery cell.

The solutions described in the embodiments of the present application are all applicable to various electrical devices using batteries.

The electrical device may be a vehicle, a mobile phone, a portable device, a laptop, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended range electric vehicle, or the like. The spacecraft includes airplanes, rockets, space shuttles, spaceships, and the like. The electric toy includes fixed or mobile electric toys, such as game consoles, electric car toys, electric ship toys and electric airplane toys. The electric tool includes metal cutting electric tools, grinding electric tools, assembly electric tools and railway electric tools, such as electric drills, electric grinders, electric wrenches, electric screwdrivers, electric hammers, electric impact drills, concrete vibrators, electric planers, and the like. Embodiments of the present application do not impose special limitations on the above electrical device.

For the convenience of illustration, the following embodiments are illustrated with the electrical device being a vehicle as an example.

Figure 1:
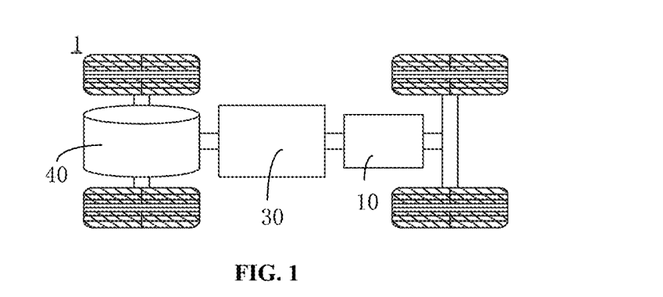
FIG. 1 is a schematic structural diagram of a vehicle disclosed in an embodiment of the present application.

As an example, as shown in FIG. 1, a schematic structural diagram of a vehicle 1 according to an embodiment of the present application is shown. The vehicle 1 may be a fuel vehicle, a gas vehicle, or a new energy vehicle, and the new energy vehicle may be an all-electric vehicle, a hybrid vehicle, an extended range electric vehicle, or the like. The interior of the vehicle 1 can be provided with a motor 40, a controller 30, and a battery 10, and the controller 30 is used for controlling the battery 10 to power the motor 40. As an example, the battery 10 may be arranged at the bottom or the head or the tail of the vehicle 1. The battery 10 may be configured to supply power to the vehicle 1. As an example, the battery 10 may be used as an operating power source of the vehicle 1, which is used for a circuit system of the vehicle 1, for example, for operation power requirements of the vehicle 1 during starting, navigation and running. In another embodiment of the present application, the battery 10 can serve not only as an operating power supply for the vehicle 1, but also as a driving power source for the vehicle 1, so as to replace or partially replace fuel or natural gas to provide driving power for the vehicle 1.

In order to meet different power requirements for use, the battery may include a plurality of battery cells, wherein the plurality of battery cells may be connected to each other in a series connection or a parallel connection or a parallel-series connection which is a mixture of series and parallel connections. The battery may also be referred to as a battery pack. Optionally, a plurality of battery cells may first be connected in a series connection or parallel connection or parallel-series connection manner to form a battery module, and then a plurality of battery modules are then be connected in a series connection or parallel connection or parallel-series connection manner to form a battery. That is, a plurality of battery cells can directly form a battery, or alternatively they can first form battery modules, and then the battery modules then form a battery.

Figure 2:
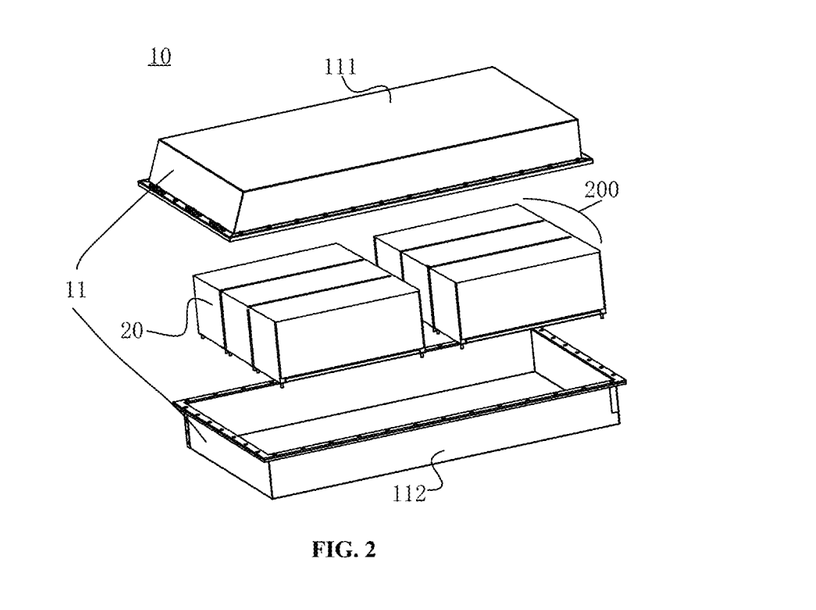
FIG. 2 is a schematic exploded structural diagram of a battery disclosed in an embodiment of the present application.

For example, FIG. 2 shows a schematic structural diagram of a battery 10 according to an embodiment of the present application. The battery 10 may include at least one battery module 200. The battery module 200 includes a plurality of battery cells 20. The battery 10 may further include a box body 11, the interior of the box body 11 is a hollow structure, and a plurality of battery cells 20 are accommodated in the box body 11. FIG. 2 shows a possible implementation of the box body 11 according to an embodiment of the present application. As shown in FIG. 2, the box body 11 may include two portions, which are referred to as a first portion 111 and a second portion 112 respectively, and the first portion 111 and the second portion 112 are snap-fitted together. The shapes of the first portion 111 and the second portion 112 may be determined according to a combined shape of the battery modules 200, and at least one of the first portion 111 and the second portion 112 has an opening. For example, as shown in FIG. 2, the first portion 111 and the second portion 112 may each be hollow cuboid with only one face as an opening face, the opening of the first portion 111 and the opening of the second portion 112 are disposed opposite to each other, and the first portion 111 and the second portion 112 are snap-fitted to each other to form the box body 11 having a closed chamber.

For another example, unlike that shown in FIG. 2, only one of the first portion 111 and the second portion 112 may be a hollow cuboid having an opening, and the other may be of a plate shape to cover the opening. For example, here taking the second portion 112 as a hollow cuboid with only one face as an opening face and the first portion 111 of a plate shape as an example, the first portion 111 covers the opening of the second portion 112 to form the box body 11 with the closed chamber which can be used for accommodate a plurality of battery cells 20. After the plurality of battery cells 20 are connected in a parallel connection or series connection or parallel-series connection manner, they are placed in the box body 11 formed after the first portion 111 and the second portion 112 are snap-fitted together.

Optionally, the battery 10 may further include other structures, which will not be repeated here anymore. For example, the battery 10 may further include a bus component for realizing electrical connection among the plurality of battery cells 20, for example in a parallel connection or series connection or parallel-series connection manner. Specifically, the bus component may realize electrical connection among the battery cells 20 by connecting electrode terminals of the battery cells 20. Further, the bus component may be fixed to the electrode terminals of the battery cells 20 by welding. Electric energy of the plurality of battery cells 20 may be further led out by an electrically conductive mechanism through the box body 11.

Depending on different power requirements, the number of battery cells 20 in a battery module 200 may be set to any numerical value. The plurality of battery cells 20 may be connected in a parallel connection or series connection or parallel-series connection manner to achieve a larger capacity or power. Since the number of battery cells 20 included in each battery 10 may be large, in order to facilitate installation, the battery cells 20 are disposed in groups, and each group of battery cells 20 forms a battery module 200. The number of battery cells 20 included in the battery module 200 is not limited, and can be set as required.

Figure 3:
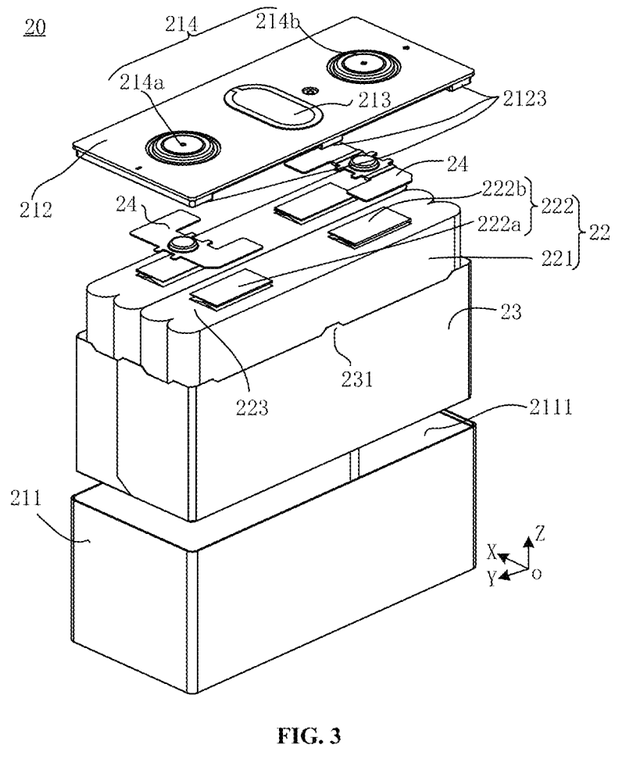
FIG. 3 is a schematic exploded structural diagram of a battery cell disclosed in an embodiment of the present application.
Figure 4:
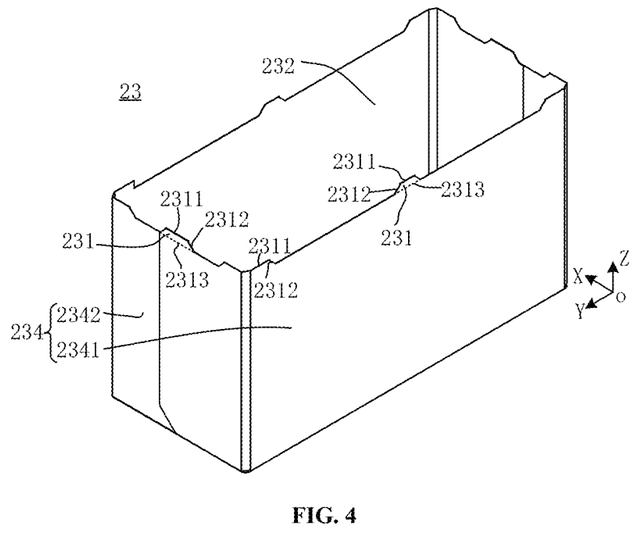
FIG. 4 is a schematic structural diagram of an insulating guard layer disclosed in an embodiment of the present application.

FIG. 3 is a schematic exploded structural diagram of a battery cell 20 according to an embodiment of the present application, and FIG. 4 is a schematic structural diagram of an insulating guard layer 23 of a battery cell 20 according to an embodiment of the present application. As shown in FIGS. 3 and 4, the battery cell 20 of the embodiments of the present application can include: a case 211, which is a hollow structure having a first opening end 2111; an end cover assembly 212 for covering the first opening end 2111; an electrode assembly 22 accommodated in the case 211; and an insulating guard layer 23 disposed between the electrode assembly 22 and the case 211 to wrap at least part of the electrode assembly 22, wherein the insulating guard layer 23 includes a main body portion 234 and a protrusion structure 231, the main body portion 234 has a second opening end 232 facing the first opening end 2111, the protrusion structure 231 is connected to the second opening end 232 and extends toward the end cover assembly 212, and the protrusion structure 231 is used for connecting with the end cover assembly 212.

It should be understood that the case 211 of the embodiments of the present application is a component for accommodating the electrode assembly 22. The case 211 may be a hollow structure with opening(s) formed at one or more ends. For example, if the case 211 is a hollow structure with an opening formed at one end, then one end cover assembly 212 may be provided; and if the case 211 is a hollow structure with openings formed at two opposite ends, then two end cover assemblies 212 may be provided, and the two end cover assemblies 212 cover the openings at the two ends of the case 211 respectively. Therefore, the first opening end 2111 of the embodiments of the present application is an end face where any opening of the case 211 is located, and the end cover assembly 212 is a component for covering the first opening end 2111.

The case 211 may be of various shapes, such as a cylinder, a cuboid, or other polyhedrons. Exemplarily, as shown in FIG. 3, in the embodiments of the present application, the case 211 being a cuboid structure and the case 211 being a hollow structure with an opening formed at one end, is mainly taken as an example for description.

It should be understood that the end cover assembly 212 of the embodiments of the present application is a component for covering the first opening end 2111 of the case 211 to isolate an internal environment of the battery cell 20 from an external environment. The shape of the end cover assembly 212 may be adapted to the shape of the case 211. As shown in FIG. 3, the case 211 is of a cuboid structure, and the end cover assembly 212 is of a rectangular plate-like structure adapted to the case 211.

In embodiments of the present application, the case 211 may be made of various materials, such as copper, iron, aluminum, steel, aluminum alloy, and the like. The end cover assembly 212 may be made of various materials, such as copper, iron, aluminum, steel, aluminum alloy, and the like. Optionally, the material of the end cover assembly 212 may be the same or different from that of the case 211.

In the battery cell 20, the electrode assembly 22 is a component that undergoes an electrochemical reaction in the battery cell 20. According to actual usage requirements, one or more electrode assemblies 22 may be disposed in the case 211. For example, as shown in FIG. 3, 4 electrode assemblies 22 are disposed in the battery cell 20. The electrode assembly 22 may be a cylinder, a cuboid, or the like. If the electrode assembly 22 is a cylindrical structure, the case 211 may also be a cylindrical structure, and if the electrode assembly 22 is a cuboid structure, the case 211 may also be a cuboid structure.

It should be understood that, as shown in FIG. 3, the electrode assembly 22 includes a tab 222 and an electrode body portion 221. The tab 222 of the electrode assembly 22 may include a positive tab 222a and a negative tab 222b. The positive tab 222a may be formed by stacking portions of a positive electrode plate that are not coated with a positive-electrode active material layer. The negative tab 222b may be formed by stacking portions of a negative electrode plate that are not coated with a negative-electrode active material layer. The electrode body portion 221 may be formed by stacking or winding portions of the positive electrode plate that are coated with the positive-electrode active material layer and portions of the negative electrode plate that are coated with the negative-electrode active material layer.

It should be understood that the insulating guard layer 23 of the embodiments of the present application is a hollow structure having at least one opening. For example, as shown in FIGS. 3 and 4, the present application mainly takes the insulating guard layer 23 having a second opening end 232 as an example, and the opening direction of the second opening end 232 is consistent with that of the first opening end 2111. The insulating guard layer 23 is disposed between the case 211 and the electrode assembly 22. The hollow structure of the insulating guard layer 23 is used for accommodating the electrode assembly 22, so that the insulating guard layer 23 wraps at least part of the electrode assembly 22. The insulating guard layer 23 can be used for maintaining electrical insulation between the electrode assembly 22 and the inner wall of the case 211. For example, the insulating guard layer 23 may be a film-shaped cover layer made of an insulating material to clad at least part of the periphery of the electrode assembly 22.

In the embodiments of the present application, the shape of the insulating guard layer 23 can be determined according to the shape of the electrode assembly 22 or the shape of the case 211. For example, in the embodiments of the present application, the insulating guard layer 23 being a cuboid is taken as an example, but the embodiments of the present application are not limited to this.

It should be understood that the main body portion 234 of the insulating guard layer 23 has a second opening end 232, and the protrusion structure 231 is connected to the second opening end 232. For example, for the cuboid insulating guard layer 23, the main body portion 234 may have four side walls adjacent to the second opening end 232 and a bottom wall opposite to the second opening end 232. The protrusion structure 231 of the insulating guard layer 23 in the embodiments of the present application can be disposed on any one of the side walls of the main body portion 234. For example, the main body portion 234 of the insulating guard layer 23 may have two first side walls 2341 having the largest area and disposed oppositely; and also for example, the insulating guard layer 23 may also have two second side walls 2342 having a smaller area and disposed oppositely. Also, the first side wall 2341 and the second side wall 2342 of the insulating guard layer 23 intersect.

Correspondingly, the protrusion structure 231 of the insulating guard layer 23 can be located on any side wall of the insulating guard layer 23, and each side wall can be provided with one or more protrusion structures 231. For example, the first side wall 2341 of the insulating guard layer 23 may be provided with one or more protrusion structures 231; and as another example, the second side wall 2342 of the insulating guard layer 23 may be provided with one or more protrusion structures 231.

Therefore, in the battery cell 20 of the embodiments of the present application, the insulating guard layer 23 has a main body portion 234. The main body portion 234 has a second opening end 232, and the protrusion structure 231 connected with the second opening end 232 extends toward the end cover assembly 212, and the connection between the protrusion structure 231 and the end cover assembly 212 can enable the connection between the insulating guard layer 23 and the end cover assembly 212. When a traditional insulating guard layer 23 is connected with the end cover assembly 212, the main body portion 234 of the insulating guard layer 23 is not provided with the protrusion structure 231. That is, an edge of the main body portion 234 for forming an edge of the second opening end 232 is basically flush, and the main body portion is connected to the end cover assembly 212 by the flush edge. Then the insulating guard layer 23 may be lifted, misaligned or wrinkled during the connection. Since the end cover assembly 212 needs to cover the first opening end 2111 of the case 211, for example, the end cover assembly 212 can be connected to the case 211 by welding, then when the insulating guard layer 23 is connected to the end cover assembly 212, if the insulating guard layer 23 is misaligned or lifted, it is likely to affect a welding region between the end cover assembly 212 and the case 211, causing a welding explosion point to affect the connection between the end cover assembly 212 and the case 211, thereby reducing the processing efficiency of the battery cell 20, and also affecting the security of the battery cell 20. The insulating guard layer 23 in the embodiments of the present application is provided with a protrusion structure 231 at which the connection between the insulating guard layer 23 and the end cover assembly 212 is realized. On one hand, the risk of the insulating guard layer 23 being lifted or misaligned can be reduced; and on the other hand, a region of the insulating guard layer 23 in which no protrusion structure 231 is disposed can be avoided from the welding region between the end cover assembly 212 and the case 211, so as to reduce the impact of the connection between the insulating guard layer 23 and the end cover assembly 212 on the connection between the end cover assembly 212 and the case 211, thereby improving the processing efficiency and safety performance of the battery cell 20.

For convenience of description, in the embodiments of the present application, three mutually perpendicular directions are defined according to the structure of the battery cell 20. Specifically, as shown in FIGS. 3 and 4, a thickness direction of the battery cell 20 in the embodiments of the present application is represented by direction X, which is also the thickness direction of the electrode assembly 22; a length direction of the battery cell 20 is represented by direction Y, which is perpendicular to the thickness direction X; and a height direction of the battery cell 20 is represented by direction Z, which is perpendicular to the length direction Y and the thickness direction X. Optionally, in the embodiments of the present application, the height direction Z being the thickness direction of the end cover assembly 212 is taken as an example, and the height direction Z is perpendicular to the first opening end 2111 and the second opening end 232.

It should be understood that the insulating guard layer 23 in the embodiments of the present application is connected to the end cover assembly 212. Specifically, the surface of the end cover assembly 212 facing the electrode assembly 22 is provided with a supporting portion 2123 protruding toward the electrode assembly 22. The protrusion structure 231 is connected to the supporting portion 2123. On one hand, since the supporting portion 2123 faces the electrode assembly 22 and is closer to the electrode assembly 22 than other regions of the end cover assembly 212, it can be used for pressing against the electrode assembly 22 to lower the possibility of the electrode assembly 22 moving in the case 211; and on the other hand, the protrusion structure 231 is connected to the supporting portion 2123 protruding from the surface of the end cover assembly 212, for example by welding, to facilitate processing and welding.

It should be understood that the end cover assembly 212 in the embodiments of the present application includes: an end cover body 2121 for covering the first opening end 2111; an insulating member 2122 located between the end cover body 2121 and the electrode assembly 22, and the protrusion structure 231 is connected with the insulating member 2122. The end cover body 2121 and the insulating member 2122 included in the end cover assembly 212 in the embodiments of the present application can be used for realizing different functions of the end cover assembly 212 respectively, which also facilitates processing. The insulating member 2122 is located between the end cover body 2121 and the electrode assembly 22. For example, the insulating member 2122 and the cover plate 2121 are stacked along the thickness direction of the cover plate 2121. In the embodiments of the present application, the thickness direction of the end cover body 2121 being the height direction Z of the battery cell 20 is taken as an example.

Figure 5:
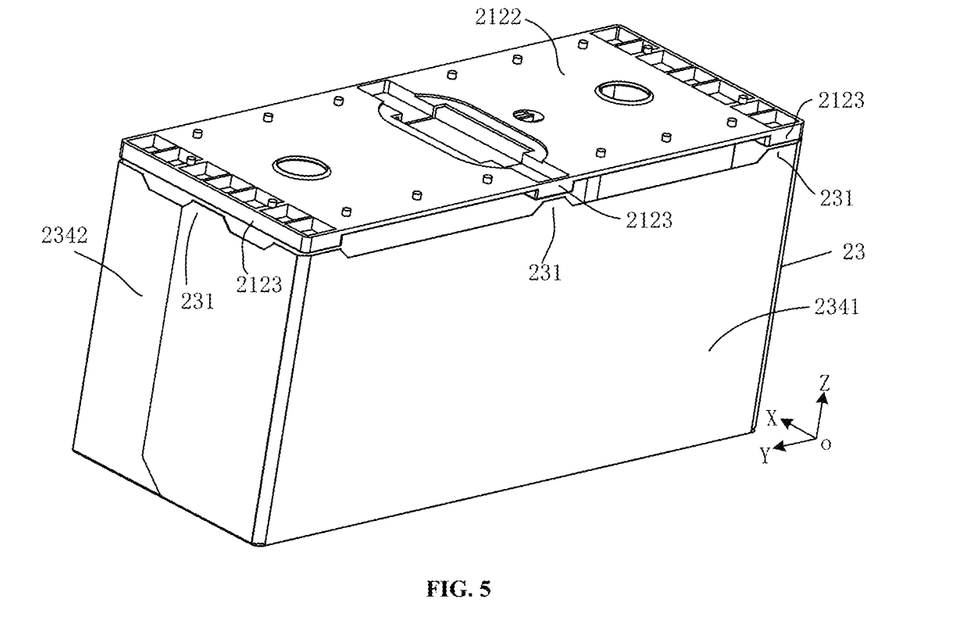
FIG. 5 is a schematic structural diagram of an insulating guard layer and an insulating member disclosed in an embodiment of the present application.

Specifically, FIG. 5 shows a schematic structural diagram of the insulating member 2122 and the insulating guard layer 23 of the end cover assembly 212 according to the embodiments of the present application. As shown in FIGS. 3 to 5, the end cover assembly 212 in the embodiments of the present application may include an end cover body 2121, which may have a plate shape and have size and shape that match the first opening end 2111 of the case 211, so as to cover the first opening end 2111 of the case 211. The material of the end cover body 2121 can be set according to actual application. For example, it can be made of a metal material, and a material that is the same or different from that of the case 211 can be selected.

Optionally, as shown in FIGS. 3 to 5, the end cover body 2121 in the embodiments of the present application can be provided with an electrode terminal 214. The electrode terminal 214 is used for electrically connecting to the electrode assembly 22, so as to output electrical energy from the battery cell 20. Specifically, the battery cell 20 may include at least two electrode terminals 214. The at least two electrode terminals 214 may include at least one positive electrode terminal 214a and at least one negative electrode terminal 214b. The positive electrode terminal 214a is used for electrically connecting with the positive tab 222a, and the negative electrode terminal 214b is used for electrically connecting with the negative tab 222b. The positive electrode terminal 214a and the positive tab 222a may be connected directly or indirectly, and the negative electrode terminal 214b and the negative tab 222b may be connected directly or indirectly. For example, the positive electrode terminal 214a is electrically connected to the positive tab 222a through a connecting member 24, and the negative electrode terminal 214b is electrically connected to the negative tab 222b through a connecting member 24.

It should be understood that different electrode terminals 214 may be located on the same wall or different walls of the battery cell 20. For example, the embodiments of the present application take the electrode terminals 214 of the battery cell 20 located on the same wall as an example. For example, the electrode terminals may all located on the end cover body 2121.

Optionally, as shown in FIGS. 3 to 5, the end cover body 2121 of the embodiments of the present application can further be provided with a pressure relief mechanism 213. Specifically, the pressure relief mechanism 213 refers to an element or component that is actuated to relieve the internal pressure or temperature of the battery cell 20 when the internal pressure or temperature reaches a predetermined threshold. The predetermined threshold may be adjusted according to different design requirements. The predetermined threshold may depend on the material of one or more of the positive electrode plate, the negative electrode plate, the electrolyte solution and the separator in the battery cell 20. The pressure relief mechanism 213 may utilize an element or component, such as a pressure-sensitive or temperature-sensitive element or component. That is, when the internal pressure or temperature of the battery cell 20 reaches a predetermined threshold, the pressure relief mechanism 213 is actuated, thereby forming a channel available for the internal pressure or temperature to be relieved.

The term "actuate" referred to in the present application refers to that the pressure relief mechanism 213 produces an action, so that the internal pressure and temperature of the battery cell 20 are relieved. The action produced by the pressure relief mechanism 213 may include, but is not limited to: at least a part of the pressure relief mechanism 213 is broken, torn or melted, and the like. After the pressure relief mechanism 213 is actuated, high-temperature and high-pressure substances in the battery cell 20 are discharged as emissions outwardly from the pressure relief mechanism 213. In this manner, the pressure of the battery cell 20 can be released under the condition of controllable pressure or temperature, thereby avoiding the occurrence of potentially more serious accidents.

The emissions from the battery cell 20 referred to in the present application include, but are not limited to: an electrolyte solution, dissolved or split positive and negative electrode plates, separator fragments, high-temperature and high-pressure gases produced from reactions, flames, and the like.

The pressure relief mechanism 213 on the battery cell 20 has an important impact on the safety of the battery. For example, when the battery cell 20 is short-circuited, overcharged, or undergoes the like phenomena, thermal runaway may occur inside the battery cell 20 and thus the pressure or temperature may rise suddenly. In this case, internal pressure and temperature can be relieved outward through the actuation of the pressure relief mechanism 213 to prevent explosion and firing of the battery cell 20.

The pressure relief mechanism 213 in the embodiments of the present application can be disposed on any wall of the battery cell 20. For example, the embodiments of the present application takes the pressure relief mechanism 213 disposed on the end cover assembly 212 as an example. Specifically, the pressure relief mechanism 213 can be disposed on the end cover body 2121. Additionally, the pressure relief mechanism 213 may be a part of the end cover body 2121, or may be a structure separated from the end cover body 2121, and be fixed onto the end cover body 2121 by, for example, welding. For example, when the pressure relief mechanism 213 is a part of the end cover body 2121, for example, the pressure relief mechanism 213 may be formed by providing an indentation on the end cover body 2121, that is, the pressure relief mechanism 213 is an indentation of the end cover body 2121, then the thickness of the region where the indentation is located is smaller than that of other regions of the end cover body 2121 except the indentation. The indentation is the weakest position of the pressure relief mechanism 213. When gas generated by the battery cell 20 is too much so that the internal pressure of the case 211 rises and reaches a threshold, or when the heat generated by an internal reaction of the battery cell 20 causes the internal temperature of the battery cell 20 to rise and reach a threshold, the pressure relief mechanism 213 can be broken at the indentation and thus lead to communication between the inside and the outside of the case 211, so that the pressure and temperature of the gas are released outwardly through the cracking of the pressure relief mechanism 213, thereby preventing the battery cell 20 from exploding.

As a further example, the pressure relief mechanism 213 may also be a structure separated from the end cover body 2121. The pressure relief mechanism 213 may take the form of an explosion-proof valve, an air valve, a pressure relief valve or a safety valve, etc., and may specifically adopt a pressure-sensitive or temperature-sensitive element or construction. That is, when the internal pressure or temperature of the battery cell 20 reaches a predetermined threshold, the pressure relief mechanism 213 performs an action or a weak structure provided in the pressure relief mechanism 213 is destroyed, thereby forming an opening or channel for releasing the internal pressure or temperature.

In the embodiments of the present application, as shown in FIGS. 3 to 5, the end cover assembly 212 may further include an insulating member 2122 located between the end cover body 2121 and the electrode assembly 22. That is, the insulating member 2122 is stacked with the end cover body 2121 and located on a side of the top cover body 2121 facing the electrode assembly 22. Specifically, the insulating member 2122 can be used for pressing against the electrode assembly 22 to reduce the possibility of the electrode assembly 22 moving in the case 211. Optionally, the material of the insulating member 2122 can be set according to actual applications. For example, the material of the insulating member 2122 can be an insulating material such as rubber or plastic. For another example, the shape of the insulating member 2122 can also be set according to actual applications. For example, the insulating member 2122 may be a plate-like structure similar in shape to the end cover body 2121 to facilitate installation. For another example, the insulating member 2122 may also be an insulating layer coated on the side of the end cover body 2121 facing the electrode assembly 22, which not only facilitates processing, but also reduces the internal space of the battery cell 20 occupied by the insulating member 2122. For ease of description, the embodiments of the present application mainly takes the insulating member 2122 as an approximate plate-shaped structure as shown in FIG. 5 as an example.

Optionally, the insulating member 2122 may have a through hole extending through the insulating member 2122 corresponding to the electrode terminal 214, for accommodating at least a part of the electrode assembly 214.

Optionally, as shown in FIGS. 3 to 5, the insulating member 2122 may be provided with a supporting portion 2123. Specifically, the surface of the insulating member 2122 facing the electrode assembly 22 is provided with a supporting portion 2123 protruding toward the electrode assembly 22, and the protrusion structure 231 is connected to the side wall of the supporting portion 2123. The insulating member 2122 is located on a side of the end cover body 2121 close to the electrode assembly 22. Therefore, the insulating member 2122 may be provided with a supporting portion 2123. For example, the insulating member 2122 is provided with a supporting portion 2123 on a side close to the electrode assembly 22, which is convenient to press against the electrode assembly 22 through the supporting portion 2123 and reduce the possibility of the electrode assembly 22 moving in the case 211. Additionally, the end cover body 2121 is used for covering the case 211, so as to connect the protrusion structure 231 with the supporting portion 2123 protruding from the surface of the insulating member 2122, for example by welding, which can reduce the impact on the connection between the end cover body 2121 and the case 211, and also facilitate the welding between the protrusion structure 231 and the supporting portion 2123.

Optionally, the supporting plate 2123 in the embodiments of the present application may be a structure integrated with the insulating member 2122 to facilitate processing, or may be a separate structure, and the embodiments of the present application are not limited thereto. For another example, the end cover body 2121 of the end cover assembly 212 can also be provided with the supporting portion 2123. For example, when the insulating member 2122 is an insulating layer coated on the surface of the end cover body 2121, the supporting portion 2123 coated with the insulating layer can be used for connecting with the protrusion structure 231.

In the embodiments of the present application, as shown in FIGS. 3 to 5, the supporting portion 2123 has a bottom wall. The bottom wall of the supporting portion 2123 faces the electrode assembly 22 and is used for pressing against the electrode assembly 22. The supporting portion 2123 further has a plurality of side walls connected by a bottom wall. For example, if the supporting portion 2123 is a cuboid, the supporting portion 2123 has four side walls. Optionally, the protrusion structure 231 can be connected to any side wall of the supporting portion 2123. For example, the protrusion structure 231 can be used for connecting with the side wall surface of the supporting portion 2123 facing the outside of the battery cell 20, so that the protrusion structure 231 is located outside the supporting portion 2123 to facilitate processing.

It should be understood that, the location of the supporting portion 2123 of the embodiments of the present application can be set flexibly according to actual applications. For example, considering that the protrusion structure 231 is connected to the supporting portion 2123, the position of the protrusion structure 231 and the position of the supporting portion 2123 are set correspondingly to facilitate processing. For another example, in order to press against the electrode assembly 22 evenly, the insulating member 2122 is usually provided with a plurality of supporting portions 2123, and the plurality of supporting portions 2123 are usually distributed symmetrically. For example, as shown in FIGS. 3 to 5, the plurality of supporting portions 2123 can be symmetrically distributed with respect to the length or width direction of the insulating member 2122. For another example, as shown in FIGS. 3 to 5, the insulating member 2122 may include two supporting portions 2123 extending along two opposite sides of the insulating member 2122. The insulating member 2122 may further include one supporting portion 2123 located between two opposite supporting portions 2123. That is, the insulating member 2122 may include three supporting portions 2123, but the embodiments of the present application are not limited thereto.

It should be understood that, the location of the protrusion structure 231 of the embodiments of the present application can be set flexibly according to actual applications. For example, the main body portion 234 of the insulating guard structure 23 may include a plurality of side walls, and any one of the plurality of side walls may be provided with the protrusion structure 231, and the number of protrusion structures 231 on different side walls may be the same or different.

Optionally, the number and positions of the protrusion structures 231 included in each side wall can also be set according to actual applications. For example, the number of the protrusion structures 231 can be set according to the area of each side wall. For another example, if each side wall includes a plurality of protrusion structures 231, the plurality of protrusion structures 231 can be evenly distributed at the edge of the side wall. That is, the spacing between two adjacent protrusion structures 231 is equal, so that the positions where the side wall is connected to the end cover assembly 212 can be evenly distributed to improve stability.

Optionally, as shown in FIGS. 3 to 5, taking the main body portion 234 of an insulating guard structure 23 including four side walls as an example, each of the four side walls may include three protrusion structures 231, and the three protrusion structures 231 on any side wall are evenly distributed, and intersecting protrusion structures 231 can also be disposed on two intersecting side walls, but the embodiments of the present application are not limited thereto.

Optionally, as an embodiment, the second opening end 232 is polygonal, and a protrusion structure 231 is disposed at a corner of the second opening end 232. Specifically, if the second opening end 232 is polygonal, then accordingly the insulating guard structure 23 includes a plurality of side walls, and the corner of the second opening end 232 corresponds to the intersection of two adjacent side walls. On one hand, disposing the protrusion structure 231 at an intersection of two adjacent side walls can increase the stability of and facilitate the implementation of the connection between the insulating guard layer 23 and the end cover assembly 212; and on the other hand, since a plurality of components included in the end cover assembly 212 are usually not disposed near the corner of the second opening end 232, the insulating guard structure 23 is provided with the protrusion structure 231 at the corner of the second opening end 232 to avoid affecting other components of the end cover assembly 212.

For example, taking those shown in FIGS. 3 to 5 as an example, when the second opening end 232 is rectangular, accordingly the main body portion 234 of the insulating guard structure 23 includes four side walls, and the second opening end 232 includes four corners, and each corner can be provided with a protrusion structure 231. Specifically, when the intersection of any first side wall 2341 and any second side wall 2342 corresponds to a corner of the second opening end 232, then the first side wall 2341 is provided with a protrusion structure 231 at the corner, and the second side wall 2342 is also provided with a protrusion structure 231 at the corner, and the two protrusion structures 231 intersect.

Optionally, a protrusion structure 231 is provided between two adjacent corners of the second opening end 232. In addition to the corners, one or more protrusion structures 231 can also be disposed between two adjacent corners of the second opening end 232. Especially when the area of each side wall is large, the size of the connection region between the insulating guard layer 23 and the end cover assembly 212 can be increased, so as to further improve the stability of the insulating guard structure 23 and not affect the connection between the end cover assembly 212 and the case 211 too much.

In the embodiments of the present application, a tab end face 223 of the electrode assembly 22 is provided with a tab 222, the tab end face 223 faces the end cover assembly 212, and the insulating guard layer 23 wraps other surfaces of the electrode assembly 22 except the tab end face 223. In this way, not only the electrode assembly 22 can be effectively isolated from the case 211 via the insulating guard structure 23, but also the electrical connection between the tab 222 of the tab end face 223 and an electrode terminal 214.

Specifically, the tab 222 of the electrode assembly 22 can be disposed on the same end face. That is, the electrode assembly 22 includes one tab end face 223; or alternatively, the tab 222 of the electrode assembly 22 can also be disposed on different end faces. For example, the electrode assembly 22 may include tabs 222 located at two opposite tab end faces 223 respectively. For example, taking those shown in FIGS. 3 to 5 as an example, all the tabs 222 of the electrode assembly 22 are located on the same end surface, that is, the electrode assembly 22 includes one tab end face 223. Accordingly, the insulating guard structure 23 wraps other surfaces of the electrode assembly 22 other than the tab end face 223. That is, the insulating guard structure 23 includes only one second opening end 232. Moreover, the case 211 has only one first opening end 2111, and the second opening end 232 of the insulating guard structure 23 corresponds to the first opening end 2111 of the case 211, so that the insulating guard structure 23 does not affect the electrical connection between the tab 222 and the electrode terminal 214 of the end cover assembly 212.

Figure 6:
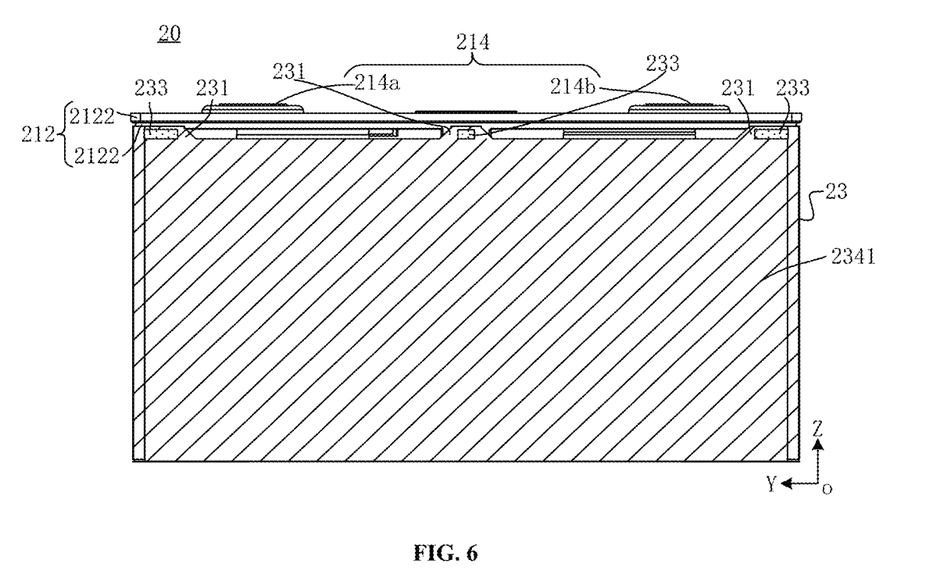
FIG. 6 is a schematic diagram of an end cover assembly and an insulating guard layer disclosed in an embodiment of the present application.
Figure 7:
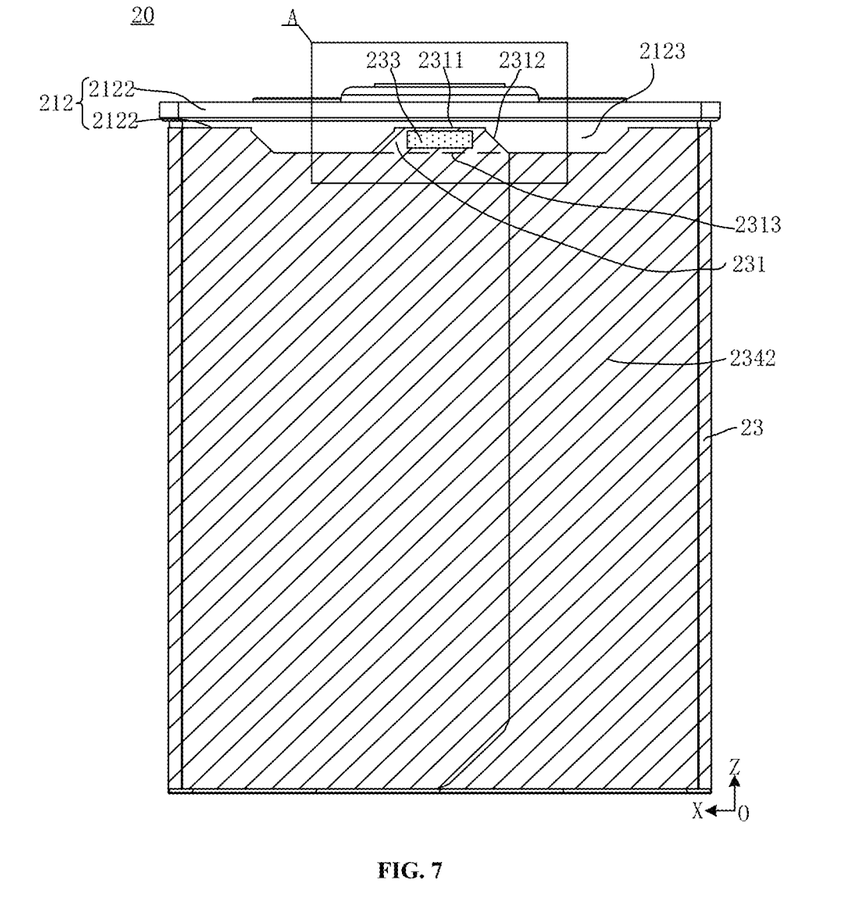
FIG. 7 is another schematic diagram of an end cover assembly and an insulating guard layer disclosed in an embodiment of the present application.
Figure 8:
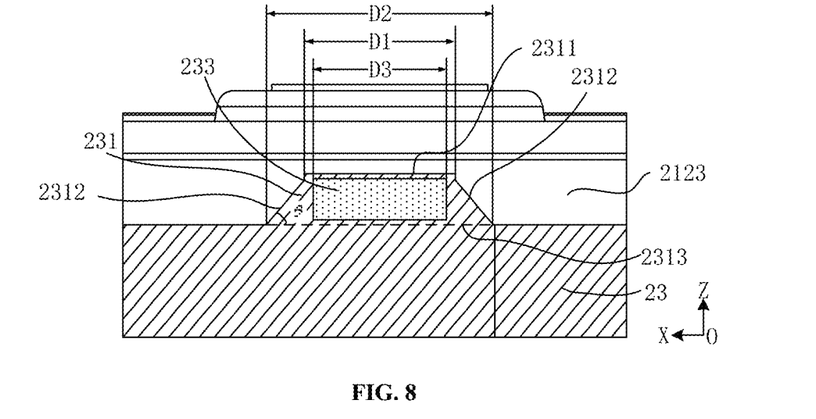
FIG. 8 is a schematic partial structural diagram of an end cover assembly and an insulating guard layer disclosed in an embodiment of the present application.

The positions of the protrusion structures 231 of the insulating guard structure 23 of the embodiments of the present application are described above with reference to the accompanying drawings. Hereafter, any protrusion structure 231 of the insulating guard structure 23 of the embodiments of the present application will be described with reference to the accompanying drawings. Specifically, FIG. 6 shows a schematic structural diagram of the insulating guard structure 23 and the end cover assembly 212 of the battery cell 20 according to the embodiments of the present application. For example, FIG. 6 mainly shows a schematic diagram of the connection between the first side wall 2341 of the insulating guard structure 23 and the end cover assembly 212. FIG. 7 shows another schematic structural diagram of the insulating guard structure 23 and the end cover assembly 212 of the battery cell 20 according to the embodiments of the present application. For example, FIG. 7 mainly shows a schematic diagram of the connection between the second side wall 2342 of the insulating guard structure 23 and the end cover assembly 212. FIG. 8 shows a schematic partial structural diagram of the insulating guard structure 23 and the end cover assembly 212 according to the embodiments of the present application. For example, FIG. 8 is a partial enlarged view of a region A in FIG. 7.

Optionally, the shape of the protrusion structures 231 in the embodiments of the present application can be set according to actual applications; and, if the insulating guard structure 23 includes a plurality of protrusion structures 231, the shapes of the plurality of protrusion structures 231 can be the same or different. For ease of description, the embodiments of the present application mainly take the plurality of protrusion structures 231 having the same shape as an example, and setting the shapes of the plurality of protrusion structures 231 to be the same is more convenient for processing.

Optionally, for any protrusion structure 231, the protrusion structure 231 can be of any regular or irregular shape. For example, the protrusion structure 231 can be any polygon. For example, the protrusion structure 231 may be triangular or quadrilateral; for example, the protrusion structure 231 may be trapezoidal; or the protrusion structure 231 may also be set to be rectangular or triangular, and the embodiments of the present application are not limited to this.

For the convenience of description, mainly the protrusion structure 231 being trapezoidal is taken as an example for description in the embodiments of the present application hereafter. Specifically, for a trapezoid, its two parallel sides are two bottom edges of the trapezoid, where the bottom edge having the shorter length is the upper base of the trapezoid, and the bottom edge having the longer length is the lower base of the trapezoid; the two non-parallel sides of the trapezoid are the waists of the trapezoid; and the height direction of the trapezoid is perpendicular to the two bottom edges of the trapezoid. Therefore, as shown in FIGS. 6 to 8, the protrusion structure 231 has an upper base 2311, a lower base 2313 and two waists 2312, where the lower base 2313 of the protrusion structure 231 is connected to other regions of the insulating guard layer 23 as a whole, and therefore, the lower base 2313 of the protrusion structure 231 is indicated by a dotted line in the figures. The upper base 2311 of the protrusion structure 231 is parallel to the lower base 2313 of the protrusion structure 231, and the length D1 of the upper base 2311 of the protrusion structure 231 is less than the length D2 of the lower base 2313 of the protrusion structure 231. Additionally, considering the processing technology or processing errors, the protrusion structure 231 in the embodiments of the present application may be approximately trapezoidal, that is, the protrusion structure 231 is generally trapezoidal, and there may be small local regions that do not meet the trapezoidal structure, but they can be ignored.

Optionally, at least one of two side edges of the protrusion structure 231 that are oppositely disposed along an own width direction of the protrusion structure includes an oblique line segment and/or a curved segment, and a width direction of the protrusion structure 231 is perpendicular to an extension direction and a thickness direction of the protrusion structure 231. Specifically, taking the protrusion structure 231 shown in FIGS. 6 to 8 as an example, any one of the two side edges of the protrusion structure 231 that are oppositely disposed along the width direction of the protrusion structure may refer to: either waist 2312 of the two waists 2312 of the protrusion structure 231 as shown in FIGS. 6 to 8; and setting the edge as an oblique line segment and/or a curved segment may refer to that: the waist 2312 shown in FIGS. 6 to 8 is the oblique line segment, or alternatively, different from the trapezoidal protrusion structure 231, the waist 2312 can be set as the curve segment, for example, it can be an arc segment or a step shape. In this way, compared with the manner of disposing the waist 2312 perpendicular to the extension direction of the protrusion structure 231, for example, compared with the case of employing a rectangular protrusion structure 231, the width of the protrusion structure 231 is different along the extension direction of the protrusion structure 231.

Thus, even if in an region where the width of the protrusion structure 231 is small, due to dimension restrictions, when welding and the like means are used for connecting, a welding stamp may exceed the range of the protrusion structure 231. However, since the protrusion structure 231 has other regions with larger widths, the welding stamp in this region will not exceed the range of the protrusion structure 231, which can not only improve the welding strength, i.e., improve the stability between the insulating guard layer 23 and the end cover assembly 212, but also prevent an edge of the welding stamp from covering the edge of the protrusion structure 231, thereby reducing the risk of incorrect or failed grasping of a boundary of the protrusion structure 231 in a process of monitoring a welding effect.

It should be understood that the extension direction of the protrusion structure 231 in the embodiments of the present application is a direction in which the protrusion structure extends from the main body portion 234 to the end cover assembly 212, or in other words, the protrusion structure 231 protrudes in the height direction of the main body portion 234; and the thickness direction of the protrusion structure 231 is a direction perpendicular or approximately perpendicular to the surface of the protrusion structure 231 with a larger area, while the width direction of the protrusion structure 231 is perpendicular to the extension direction and thickness direction of the protrusion structure 231. For example, for the protrusion structure 231 located on the first side wall 2341, if the thickness direction of the protrusion structure 231 is the thickness direction X of the battery cell 20 and the extension direction of the protrusion structure 231 is the height direction Z of the battery cell 20, then the width direction of the protrusion structure 231 is the length direction Y of the battery cell 20. For another example, for the protrusion structure 231 located on the second side wall 2342, if the thickness direction of the protrusion structure 231 is the length direction Y of the battery cell 20 and the extension direction of the protrusion structure 231 is the height direction Z of the battery cell 20, then the width direction of the protrusion structure 231 is the thickness direction X of the battery cell 20.

In the embodiments of the present application, a width of at least part of the protrusion structure 231 gradually decreases along the extension direction of the protrusion structure 231. In this way, the protrusion structure 231 has at least partial region that satisfies: the width of an area of the at least partial region close to the end cover assembly 212 is smaller, and the width of an area of the at least partial region far away from the end cover assembly 212 is larger. Therefore, for the insulating guard layer 23, the width in a region near the end cover assembly 212 is smaller, then an avoidance space of the insulating guard layer 23 between two adjacent protrusion structures 231 is larger. This avoidance space can be used for avoiding from the connection between the end cover assembly 212 and the case 211, thereby avoiding a local region of the insulating guard layer 23 from being misaligned or lifted to affect the connection between the end cover assembly 212 and the case 211. On contrary, the width in a region of the protrusion structure 231 away from the end cover assembly 212 is larger, then even if in a region of the protrusion structure 231 near the end cover assembly 212, due to dimension restrictions, when connection is conducted by welding means, the welding stamp may exceed the range of the protrusion structure 231. However, a width in the region of the protrusion structure 231 away from the end cover assembly 212 is larger, and the welding stamp in the region usually does not exceed the range of the protrusion structure 231, which can increase the welding strength, i.e., improving the stability between the insulating guard layer 23 and the end cover assembly 212.

For example, for the trapezoidal protrusion structure 231, the upper base 2311 of the protrusion structure 231 is parallel to the second opening end 232, and the width of the protrusion structure 231 gradually decreases from the insulating guard layer 23 to the end cover assembly 212. The width direction of the protrusion structure 231 is perpendicular to the height direction and thickness direction of the protrusion structure 231. As shown in FIGS. 6 to 8, the width direction of the protrusion structure 231 is parallel to the upper base 2311 and the lower base 2313 of the protrusion structure 231, the maximum value of the width of the protrusion structure 231 is the length D2 of the lower base 2313 of the protrusion structure 231, and the minimum value of the width of the protrusion structure 231 is the length D1 of the upper base 2311 of the protrusion structure 231. For example, for the protrusion structure 231 located on the first side wall 2341, the width direction of the protrusion structure 231 is the length direction Y of the battery cell 20, and the upper base 2311 of the protrusion structure 231 is parallel to the length direction Y of the battery cell 20. For another example, for the protrusion structure 231 located on the second side wall 2342, the width direction of the protrusion structure 231 is the thickness direction X of the battery cell 20, and the upper base 2311 of the protrusion structure 231 is parallel to the thickness direction X of the battery cell 20.

In the embodiments of the present application, the protrusion structure 231 is set to be trapezoidal, and for the insulating guard layer 23, the avoidance space of the insulating guard layer 23 between two adjacent protrusion structures 231 is larger when it is closer to the end cover assembly 212. The avoidance space can be used for avoiding from the connection between the end cover assembly 212 and the case 211, thereby avoiding a local region of the insulating guard layer 23 from being misaligned or lifted to affect the connection between the end cover assembly 212 and the case 211. Moreover, the width of the protrusion structure 231 of the insulating guard layer 23 is larger when the protrusion structure is farther away from the end cover assembly 212, so that even in an region of the protrusion structure 231 close to the upper base 2311, due to dimension restrictions of the upper base 2311, when connection is conducted by welding means, the welding stamp may exceed the range of the protrusion structure 231. However, a length of the lower base 2313 of the protrusion structure 231 is larger than that of the upper base 2311, and the welding stamp in a region close to the lower base 2313 usually does not exceed the range of the lower base 2313, which can improve the welding strength, i.e., improving the stability between the insulating guard layer 23 and the end cover assembly 212.

Moreover, if the connection between the protrusion structure 231 and the end cover assembly 212 is achieved by welding, a charge coupled device (CCD) can usually be used for detecting the welding effect. Specifically, for the trapezoidal protrusion structure 231, the protrusion structure 231 may be used for connecting with the end cover assembly 212, and the actual connection region may be different from the range of the trapezoidal protrusion structure 231. For the sake of distinction, in the embodiments of the present application, the connection region 233 represents a region where the protrusion structure 231 is actually connected to the end cover assembly 212. For example, as shown in FIGS. 6 to 8, the protrusion structure 231 is connected to the supporting portion 2123 of the end cover assembly 212 by welding, and the connection region 233 represents the actual welding region between the protrusion structure 231 and the supporting portion 2123.

When the welding effect is detected, the boundary of the trapezoidal protrusion structure 231 can be captured by CCD. For example, the waist 2312 of the protrusion structure 231 can be captured, and in turn the possible range of the connection region 233 can be fitted. For example, a virtual rectangular region can be fitted, and in turn an effective welding stamp range can be identified by color difference. That is, the range of the actual connection region 233 can be identified for determining the welding effect between the protrusion structure 231 and the supporting portion 2123. Compared with the case of employing a rectangular protrusion structure 231, the actual welding stamp of the rectangular protrusion structure 231 easily exceeds the range of the protrusion structure 231, which easily causes CCD capture abnormalities and cannot identify the actual range of the connection region 233, which in turn causes detection overkill and reduces the qualified rate of the battery cell 20, i.e. reducing the production efficiency of the battery cell 20.

It should be understood that, the dimension of the protrusion structure 231 of the embodiments of the present application may be set according to actual applications. For example, the protrusion structure 231 is trapezoidal, and the length D1 of the upper base 2311 of the protrusion structure 231 satisfies: $\Delta D = D1 - D3$, and the value range of $\Delta D$ is [2 mm, 10 mm]; where D3 is the width of the connection region 233 between the protrusion structure 231 and the end cover assembly 212, and the width direction of the connection region 233 is parallel to the upper base 2311 of the protrusion structure 231. Specifically, the shape of the connection region 233 in the embodiments of the present application can be any shape. For example, the shape of the connection region 233 can be related to the connection manner. For example, the connection region 233 may be a rectangle, a circle, a ring, a square ring, etc. Correspondingly, the width D3 of the connection region 233 is the maximum length of the connection region 233 in the width direction. Additionally, the width direction of the connection region 233 is consistent with that of the protrusion structure 231. For example, the width direction of the connection region 233 is parallel to the upper base 2311 of the protrusion structure 231. This "parallel" is not strictly parallel, but approximately parallel within an allowable error range. For example, if the embodiments of the present application takes a rectangle as an example, the width D3 of the connection region 233 is as shown in FIGS. 6 to 8.

The length D1 of the upper base 2311 of the protrusion structure 231 is the minimum value of the width of the protrusion structure 231, and the width D3 of the connection region 233 is set to be smaller than the length D1 of the upper base 2311 of the protrusion structure 231, so that the connection region 233 will not exceed the protrusion structure 231, and the connection strength between the insulating guard layer 23 and the end cover assembly 212 can be improved. Additionally, the difference $\Delta D$ between the length D1 of the upper base 2311 of the protrusion structure 231 and the width D3 of the connection region 233 should not be set too large, otherwise the width of the protrusion structure 231 will be too large, and accordingly the avoidance space between adjacent protrusion structures 231 is smaller, which may affect the connection between the end cover assembly 212 and the case 211. On the contrary, the difference $\Delta D$ between the length D1 of the upper base 2311 of the protrusion structure 231 and the width D3 of the connection region 233 should also not be set too small, so as to avoid increasing the difficulty in processing the connection between the insulating guard layer 23 and the end cover assembly 212. Therefore, the value range of the difference $\Delta D$ between the length D1 of the upper base 2311 of the protrusion structure 231 and the width D3 of the connection region 233 can be set to [2 mm, 10 mm]. For example, the difference $\Delta D$ can be set to 2 mm, 4 mm, 6 mm, 8 mm or 10 mm.

Optionally, the lengths of the two waists 2312 of the protrusion structure 231 can be set according to actual applications, and the lengths of the two waists 2312 of the protrusion structure 231 can be the same or different. For example, as shown in FIGS. 6 to 8, for the protrusion structure 231 located in the middle region of any side wall of the main body portion 234, the lengths of the two waists 2312 of the protrusion structure 231 can be the same, that is, the protrusion structure 2321 can be set as an isosceles trapezoid. For another example, for the protrusion structure 231 located in the intersection region of the two side walls of the protrusion structure 231, the protrusion structure 231 on each side wall 234 can be regarded as a right-angled trapezoid, so that two adjacent right-angled trapezoidal protrusion structures 231 intersect. Moreover, in the intersection region of the two side walls, for the situation where two right-angled trapezoidal protrusion structures 231 intersect, i.e., the situation where the waists of the two protrusion structures 231 perpendicular to the upper base 2311 overlap, the dimensions related to the waists 2312 of the protrusion structure 231 described hereafter do not include the overlapped waists, i.e., including only the inclined waist 2312 of each right-angled trapezoidal protrusion structure 231.

Optionally, a value range of the length of the waist 2312 of the protrusion structure 231 is [2 mm, 6 mm]. If the length of the waist 2312 of the protrusion structure 231 is too small, the height of the protrusion structure 231 will also be too small, and the insulating guard layer 23 can not effectively avoid from the connection portion between the end cover assembly 212 and the case 211. Misalignment or lifting of the insulating guard layer 23 will affect the welding between the end cover assembly 212 and the case 211, which reduces the safety of the battery cell 20. On the contrary, if the length of the waist 2312 of the protrusion structure 231 is too large, and if an angle between the waist 2312 of the protrusion structure 231 and the lower base 2313 is constant, then the height of the protrusion structure 231 will be too large, so that in order to effectively isolate the electrode assembly 22 from the case 211, the height of the electrode assembly 22 will be reduced, which will reduce the utility rate of space inside the battery cell 20 and also reduce the energy density of the battery cell 20.

Therefore, the length of the waist 2312 of the protrusion structure 231 should not be too large or too small, for example, it can be set to 2 mm, 3 mm, 4 mm, 5 mm or 6 mm.

Optionally, the value range of the angle θ between the waist 2312 and the lower base 2313 of the protrusion structure 231 is [30°, 60°]. Specifically, for the inclined waist 2312 of the protrusion structure 231, the angle θ between the waist 2312 and the lower base 2313 should not be too large or too small. If the angle θ is too small, the height of the protrusion structure 231 will be too small, and the insulating guard layer 23 can not effectively avoid from the connection portion between the end cover assembly 212 and the case 211. Misalignment or lifting of the insulating guard layer 23 will affect the welding between the end cover assembly 212 and the case 211, which reduces the safety of the battery cell 20. On the contrary, if the angle θ is too large, the shape of the protrusion structure 231 will be close to a rectangle. At this time, if the width of the protrusion structure 231 is too small, the connection region between the insulating guard layer 23 and the end cover assembly 212 will be too small, which increases the difficulty of connection; and if the width of the protrusion structure 231 is too large, the avoidance space between adjacent protrusion structures 231 will be too small, making it impossible to effectively avoid from the connection portion between the end cover assembly 212 and the case 211, which will also reduce the safety of the battery cell 20.

Therefore, the angle θ between the waist 2312 and the lower base 2313 should not be too large or too small. For example, the angle θ can be set to 30°, 35°, 40°, 45°, 50°, 55° or 60°.

In the embodiments of the present application, the insulating guard layer 23 has a main body portion 234. The main body portion 234 has a second opening end 232, and the protrusion structure 231 connected with the second opening end 232 extends toward the end cover assembly 212, and the connection between the protrusion structure 231 and the end cover assembly 212 can enable the connection between the insulating guard layer 23 and the end cover assembly 212. When a traditional insulating guard layer 23 is connected with the end cover assembly 212, the main body portion 234 of the insulating guard layer 23 is not provided with the protrusion structure 231. That is, an edge of the main body portion 234 for forming an edge of the second opening end 232 is basically flush, and the main body portion is connected to the end cover assembly 212 by the flush edge. Then the insulating guard layer 23 may be lifted, misaligned or wrinkled during the connection. Since the end cover assembly 212 needs to cover the first opening end 2111 of the case 211, for example, the end cover assembly 212 can be connected to the case 211 by welding, then when the insulating guard layer 23 is connected to the end cover assembly 212, if the insulating guard layer 23 is misaligned or lifted, it is likely to affect a welding region between the end cover assembly 212 and the case 211, causing a welding explosion point to affect the connection between the end cover assembly 212 and the case 211, thereby reducing the processing efficiency of the battery cell 20, and also affecting the security of the battery cell 20. The insulating guard layer 23 in the embodiments of the present application is provided with a protrusion structure 231 at which the connection between the insulating guard layer 23 and the end cover assembly 212 is realized. On one hand, the risk of the insulating guard layer 23 being lifted or misaligned can be reduced; and on the other hand, a region of the insulating guard layer 23 in which no protrusion structure 231 is disposed can be avoided from the welding region between the end cover assembly 212 and the case 211, so as to reduce the impact of the connection between the insulating guard layer 23 and the end cover assembly 212 on the connection between the end cover assembly 212 and the case 211, thereby improving the processing efficiency and safety performance of the battery cell 20.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather comprises all technical solutions falling within the scope of the claims.

What is claimed is:
1. A battery cell, comprising:
   a case, which is a hollow structure having a first opening end;
   an end cover assembly for covering the first opening end;
   an electrode assembly accommodated in the case; and
   an insulating guard layer disposed between the electrode assembly and the case to wrap at least part of the electrode assembly, wherein the insulating guard layer comprises a main body portion and a protrusion structure, the main body portion has a second opening end facing the first opening end, the protrusion structure is connected with the second opening end and extends toward the end cover assembly, and the protrusion structure is used for connecting with the end cover assembly.

2. The battery cell according to claim 1, wherein the end cover assembly comprises:
  an end cover body for covering the first opening end; and
  an insulating member located between the end cover body and the electrode assembly, wherein the protrusion structure is connected with the insulating member.

3. The battery cell according to claim 2, wherein a surface of the insulating member facing the electrode assembly is provided with a supporting portion protruding toward the electrode assembly, and the protrusion structure is connected to a side wall of the supporting portion.

4. The battery cell according to claim 1, wherein at least one of two side edges of the protrusion structure that are oppositely disposed along an own width direction of the protrusion structure comprises an oblique line segment and/or a curved segment, and the width direction of the protrusion structure is perpendicular to an extension direction and a thickness direction of the protrusion structure.

5. The battery cell according to claim 4, wherein a width of at least part of the protrusion structure gradually decreases along the extension direction of the protrusion structure.

6. The battery cell according to claim 4, wherein the protrusion structure is trapezoidal, and a length D1 of an upper base of the protrusion structure satisfies: $\Delta D = D1 - D3$, with a value range of the $\Delta D$ of [2 mm, 10 mm],
  wherein, D3 is a width of a connection region between the protrusion structure and the end cover assembly, and a width direction of the connection region is parallel to the upper base of the protrusion structure.

7. The battery cell according to claim 6, wherein a value range of a length of a waist of the protrusion structure is [2 mm, 6 mm].

8. The battery cell according to claim 6, wherein a value range of an angle between the waist and a lower base of the protrusion structure is [30°, 60°].

9. The battery cell according to claim 1, wherein the second opening end is polygonal, and a corner of the second opening end is provided with the protrusion structure.

10. The battery cell according to claim 9, wherein the protrusion structure is disposed between two adjacent corners of the second opening end.

11. The battery cell according to claim 1, wherein a tab end face of the electrode assembly is provided with a tab, and the tab end face faces the end cover assembly, and
  the insulating guard layer wraps other surfaces of the electrode assembly except the tab end face.

12. A battery, comprising:
a plurality of battery cells according to claim 1.

13. An electrical device, comprising:
  a plurality of battery cells according to claim 1, wherein the battery cell is used for providing electrical energy for the electrical device.

* * * * *